(12) United States Patent
Fuka et al.

(10) Patent No.: US 11,380,630 B2
(45) Date of Patent: Jul. 5, 2022

(54) INTEGRATED CIRCUIT PACKAGE THAT MEASURES AMOUNT OF INTERNAL PRECIOUS MATERIAL

(71) Applicant: International Business Machines Corporation, Armonk, NY (US)

(72) Inventors: Louis Thomas Fuka, Austin, TX (US); Robert John Nonnenkamp, Germantown, MD (US); Charles Patrick Brown, Middletown, MD (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 16/871,162

(22) Filed: May 11, 2020

(65) Prior Publication Data

US 2021/0349044 A1    Nov. 11, 2021

(51) Int. Cl.
*H01L 23/00* (2006.01)
*G01N 27/02* (2006.01)
*G01N 27/22* (2006.01)
*G01N 27/04* (2006.01)
*G06Q 20/04* (2012.01)
*G06Q 20/22* (2012.01)
*H01L 27/02* (2006.01)
*H05K 1/02* (2006.01)

(52) U.S. Cl.
CPC ........... *H01L 23/57* (2013.01); *G01N 27/028* (2013.01); *G01N 27/045* (2013.01); *G01N 27/228* (2013.01); *G06Q 20/04* (2013.01); *G06Q 20/22* (2013.01); *H01L 27/02* (2013.01); *H05K 1/0275* (2013.01)

(58) Field of Classification Search
CPC .......... H01L 23/57–576; H05K 1/0275; G07F 7/0826
See application file for complete search history.

(56) References Cited

U.S. PATENT DOCUMENTS

| | | |
|---|---|---|
| 5,120,589 A | 6/1992 | Morikawa |
| 9,024,763 B2 | 5/2015 | Hamedani |
| 9,524,459 B2 | 12/2016 | Salle |
| 9,684,860 B2 | 6/2017 | Zambrano L |
| 2005/0072520 A1 | 4/2005 | Berman |
| 2015/0283845 A1 | 10/2015 | Marcus |

*Primary Examiner* — Tucker J Wright
(74) *Attorney, Agent, or Firm* — David B. Woycechowsky

(57) ABSTRACT

Integrated circuit package (ICP) with: (i) stored information pertaining to an amount and/or value of precious material present in the ICP; and (ii) sensor for detecting an amount of precious material present in the ICP. In some embodiments the ICP is embedded in a smart card for use with a smart card reader system that can communicate data to and/or from the ICP.

17 Claims, 5 Drawing Sheets

INTEGRATED CIRCUIT PACKAGE THAT MEASURES AMOUNT OF INTERNAL PRECIOUS MATERIAL

BACKGROUND

The present invention relates generally to the field of valuable objects (for example, hard currency), and also to the field of recovery of precious materials (for example, gold) from integrated circuit packages.

People value silver, gold, and platinum as a store of wealth and a basis for currency used in various financial transactions. These financial transactions are typically called "barter" when a formally recognized currency is not involved. For purposes of the present document: (i) the distinction between formally recognized currency and other valuable objects (subject to barter) is not particularly important; and (ii) "currency" is hereby defined to mean any valuable object regardless of whether it is promulgated as a formally recognized currency.

The Wikipedia entry for "smart card" (as of 14 Jan. 2020) states, in part, as follows: "A smart card, chip card, or integrated circuit card (ICC) is a physical electronic authorization device, used to control access to a resource. It is typically a plastic credit card-sized card with an embedded integrated circuit (IC) chip. Many smart cards include a pattern of metal contacts to electrically connect to the internal chip. Others are contactless, and some are both. Smart cards can provide personal identification, authentication, data storage, and application processing. Applications include identification, financial, mobile phones (SIM), public transit, computer security, schools, and healthcare. Smart cards may provide strong security authentication for single sign-on (SSO) within organizations. Numerous nations have deployed smart cards throughout their populations. The universal integrated circuit card, or SIM card, is also a type of smart card. As of 2015, 10.5 billion smart card IC chips are manufactured annually, including 5.44 billion SIM card IC chips." (footnotes omitted)

For purposes of this document, the term "integrated circuit package" (or ICP) is defined as follows: Any integrated circuit or monolithic integrated circuit including a set of electronic circuits on one small flat piece (or "chip") of semiconductor material (for example, silicon). The ICP may have any packaging style and/or geometry now known or to be developed in the future (for example, some IC packages are designed for embedding into a smart card). The ICP may have any type and/or combination of IC components (for example, MOS transistors) now known or to be developed in the future.

SUMMARY

According to an aspect of the present invention, there is a integrated circuit package product (ICPP) including an integrated circuit package (ICP) that includes: integrated circuitry; a set of substrate layer(s); a precious material reservoir made of one, or more, precious material(s); and a tamper detection device. The integrated circuitry is located on and/or between substrate layers of the set of substrate layers. The precious material reservoir is at least partially embedded in the set of substrate layer(s). The tamper detection device is structured, located, connected and/or programmed to provide an indication of tampering on condition that the physical integrity of the ICPP has been compromised.

According to a further aspect of the present invention, there is an integrated circuit package product (ICPP) including an integrated circuit package (ICP) that includes: integrated circuitry; a set of substrate layer(s); and a precious material reservoir made of one, or more, precious material(s). The integrated circuitry is located on and/or between substrate layers of the set of substrate layers. The precious material reservoir is at least partially embedded in the set of substrate layer(s). The integrated circuitry includes a data storage element that has stored reservoir data indicating a mass of the precious material reservoir as determined at a time of manufacture of the ICPP.

According to a further aspect of the present invention, there is a computer implemented method, computer program product and/or computer system for performing the following operations (not necessarily in the following order): (i) scanning an integrated circuit package product (ICPP) to determine an amount of precious material present in a precious material reservoir that is embedded in an integrated circuit package (ICP) of the ICPP; and (ii) determining a monetary value of the precious material of the precious material reservoir.

BRIEF DESCRIPTION OF THE DRAWINGS

FIG. 4 shows the external appearance of the four ICP embodiments of the present invention respectively shown in FIGS. 5, 6, 7 and 9;

DETAILED DESCRIPTION

Figure 1:
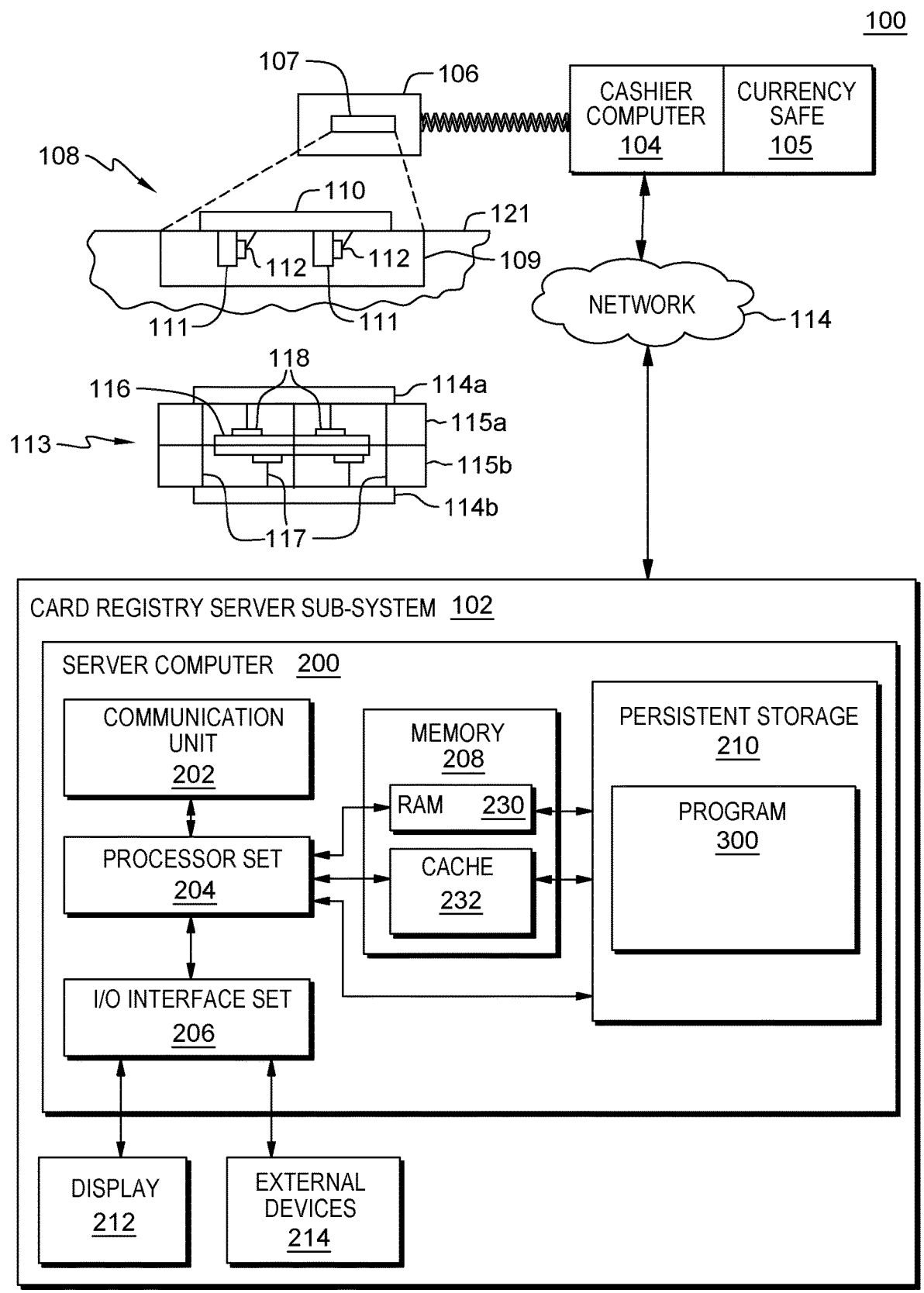
FIG. 1 is a block diagram view of a first embodiment of a system according to the present invention.

Some embodiments of the present invention are directed to an integrated circuit package (ICP) with: (i) stored information pertaining to an amount and/or value of precious material present in the ICP; and (ii) sensor(s) for detecting an amount of precious material present in the ICP. In some embodiments the ICP is embedded in a smart card for use with a smart card reader system that can communicate data to and/or from the ICP in order to allow the smart card to be exchanged for cash money, used as collateral or otherwise used in a financial transaction. In some embodiments, the ICP (for example, ICP embedded in a smart card assembly) not only communicates the information about the precious material that is embedded in the ICP, but also provides encryption and verification services. For example, by use of asymmetric encryption/decryption key technology, in conjunction with a certification authority located independently on the network, some embodiments a level of trust that the information it is transmitting is true. This Detailed Description section is divided into the following subsections: (i) Smart Card Reader System And Method; (ii) Four (4) ICP Embodiments; (iii) Further Comments and/or Embodiments; and (iv) Definitions.

I. Smart Card Reader System and Method

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, smart card currency computer system 100 is an embodiment of a hardware and software environment for use with various embodiments of the present invention. Networked computers system 100 includes: card registry server subsystem 102; cashier computer 104; currency safe 105 (which, in this example, stores physical United States cash money, not separately shown); card scanning device hardware 106 (including scanner hardware 107); first smart card assembly 108; second smart card assembly 113; and communication network 114. Card registry server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As shown in FIG. 1, first smart card 108 assembly includes: thick silicon chip 109 (which serves as a repository for precious metal and as a base for an integrated circuitry); integrated circuitry 110 (which covers precious metal); precious metal portion(s) 111 (which is plated into pits formed in thick silicon chip 109); sensors 112 (which are connected in data communication with integrated circuitry 110); and card member 121. Alternatively, in some embodiments, card member 121 may be omitted and the currency storage ICP product may take the form of a loose, discrete ICP, or the form of an ICP mechanically mounted to, or otherwise mechanically connected to, to some other type of object (for example, a carabiner).

As shown in FIG. 1, in second smart card assembly 113, precious metal is embedded in two smart chips that are fused together. Assembly 113 includes: smart chip circuitry portions 114a, 114b; two smart chips 115a, 115b; embedded precious metal 116; through chip traces 117 (surrounding embedded precious metal 116); and sensors 118 (which provides an additional layer of monitoring the precious metal). Second smart card assembly 113 also includes a card member (not shown for sake of simplicity of illustration).

Figure 2:
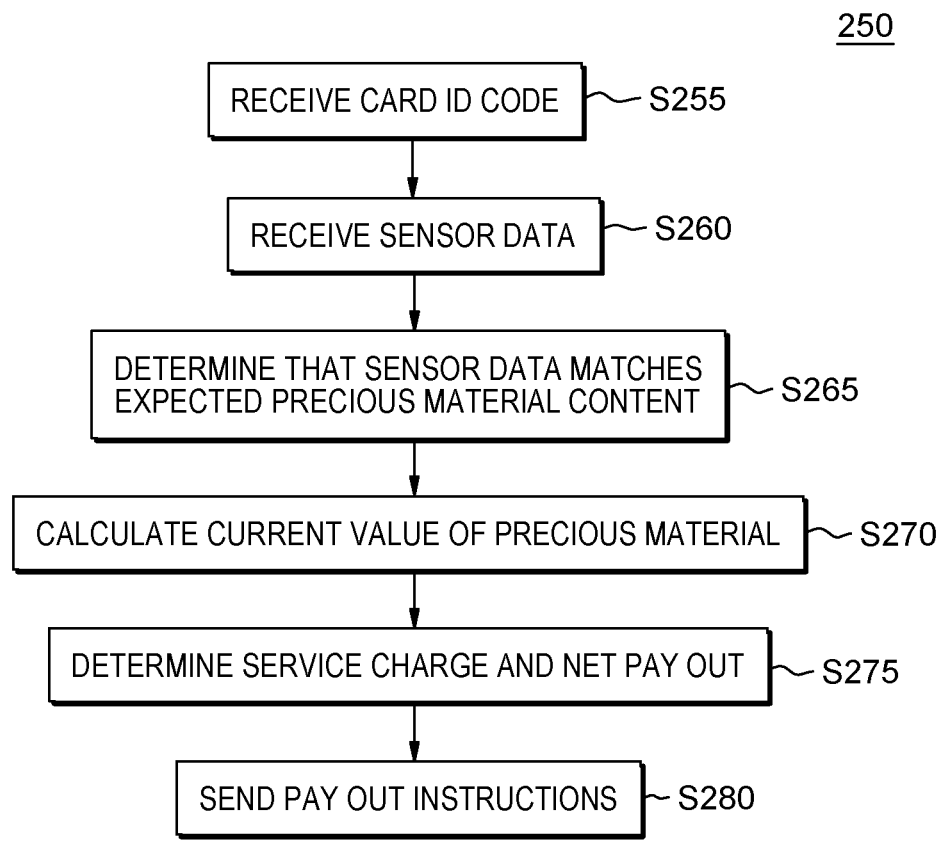
FIG. 2 is a flowchart showing a first embodiment method performed, at least in part, by the first embodiment system.
Figure 3:
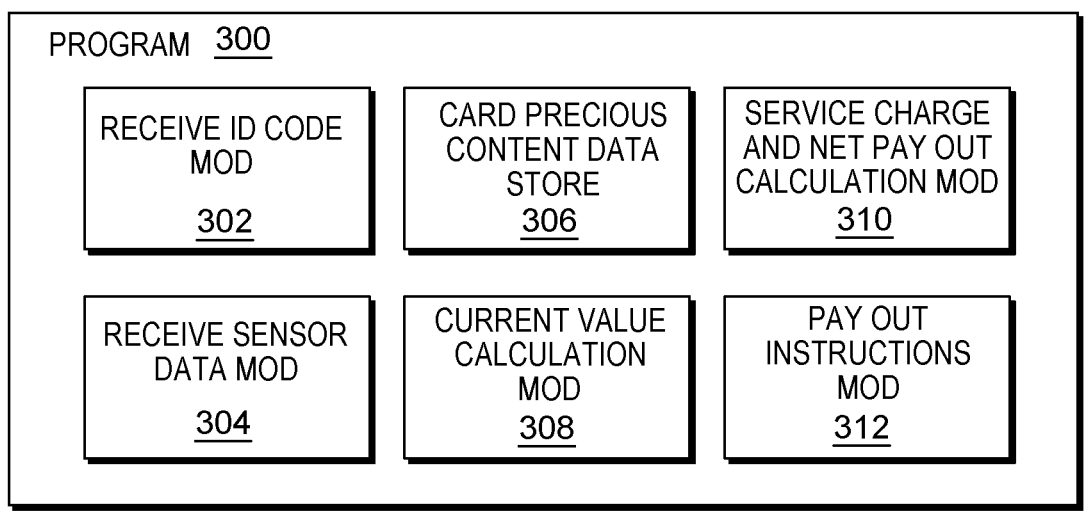
FIG. 3 is a block diagram showing a machine logic (for example, software) portion of the first embodiment system.

As shown in FIG. 1, system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

The method of flowchart 250 is a method where a user is taking her smart card, with embedded precious material, to a cashier service to exchange it for cash. In this example, the entities involved in this transaction are: (i) the user; (ii) the cashier company that owns and controls card scanning device hardware 106 (including scanner hardware 107); and (iii) a card registry service company that owns and controls card registry server subsystem 102 and the data stored thereon. Before the steps of flow chart 250 begin, the cashier has scanned the integrated circuitry 110 of the user's smart card assembly 108 to obtain at cashier computer 104: (i) an identification (ID) code for smart card assembly 108; and (ii) a value corresponding to the amount of precious material is in the precious material portions 111 of smart card assembly 108 as sensed by sensors 112. In this example, the precious material amount value is expressed in units of mass, but it may be expressed in other ways, such as volume or current market price. In this example, the precious material is rhodium, but: (i) there could be a combination of precious materials (for example, different precious material portions 111 have different precious materials with different current market prices); (ii) the precious materials may not be metals, so long as they can be effectively sensed by sensors suitable for inclusion in an ICP; and (iii) if the precious material emits harmful rays or is otherwise harmful to human health, then appropriate countermeasures need to be taken to avoid any potential for injurious outcomes.

Processing begins at operation S255, where receive identification (ID) code module ("mod") 302 receives the ID code for smart card assembly 108 from cashier computer 104 over communication network 114.

Processing proceeds to operation S260, where receive sensor data mod 304 receives, from cashier computer 104 and over communication network 114, sensor data indicating the amount of precious material in smart card assembly 108. As mentioned above, this amount value is expressed as a mass. In this example, the amount value is 0.5 grams of rhodium. In this embodiment, the various sensors are queried at the time of transmission. Alternatively, in some embodiments, direct query of the sensor is not performed—instead, the smart card can internally use the sensors to verify the quantity of precious metal either at the time of transmission, or at another time.

Processing proceeds to operation S265 where card precious content value store 306 is checked to determine whether the amount of rhodium that is sensed to be in smart card assembly (that is, 0.5 grams) matches a value that was determined to be in smart card assembly 108 at the time of manufacture of smart card assembly 108. In this example, it is determined that the amount value matches, which is an indication that smart card assembly 108 has not been subject to tampering and is genuine. Alternatively, if the amounts did not match, then smart card assembly 108 would be collected as evidence so that an investigation could determine whether tampering and/or associated fraud was being attempted. Alternatively, other types of responses could be mandated in case the analysis of the present invention indicate tampering. For example, the funds could be put into an escrow account for the card holder during an investigation. That way, if it turns out that there was no tampering (for example, a manufacturing defect in the ICP leads to anomalous results), then the card holder may be more likely to feel that the investigation is fair. A complete panoply of possible responses to a tampering investigation is, of course, beyond the scope of this document.

Processing proceeds to operation S270, where current value calculation mod 308 calculates the current market value of the precious material. In this example, the current value is determined to be $200 (US dollars).

Processing proceeds to operation S275, where service charge and net pay out calculation mod 310 calculates the amount of service charges that can be assessed in connection with the transaction of cashing out smart card assembly 108. In this example, it is determined that: (i) a $5 service charge should be payable to the card registry service entity; (ii) a $5 service charge should be payable to the cashier service; and (iii) the user should be given $190 in cash in exchange for smart card assembly 108.

Processing proceeds to operation S280, where pay out instructions mod 312 communicates, to cashier computer 104 and through communication network 114, indicating that: (i) the user should be paid $190 in cash from currency safe 105; and (ii) the cashier should send a payment of $5 to the card registry service entity.

A method according to an embodiment of the present invention, which is a variation on the embodiment discussed, above, in connection with flow chart 250, includes the following operations: (i) reader queries smart card; (ii) smartcard queries sensor; (iii) smartcard determines that sensor data matches expected precious material content; (iv) smartcard providers reader with encrypted message that provides information on ID of smartcard, quantity of metal, and other possible parameters; (v) reader queries certifying authority to verify ID of smartcard; (vi) certifying authority (CA) responds with verification of smartcard ID and optionally metal quantity associated with smartcard; (vii) reader optionally queries smart card registry to verify ownership, and other information; (viii) reader uses information from smart card, CA, and (optionally) smart card registry to determine service charge and net payout; (ix) reader sends payout instructions to payout program; and (x) reader optionally updates card registry with new ownership information, transaction information, and so on.

II. Four (4) ICP Embodiments

Figure 4:
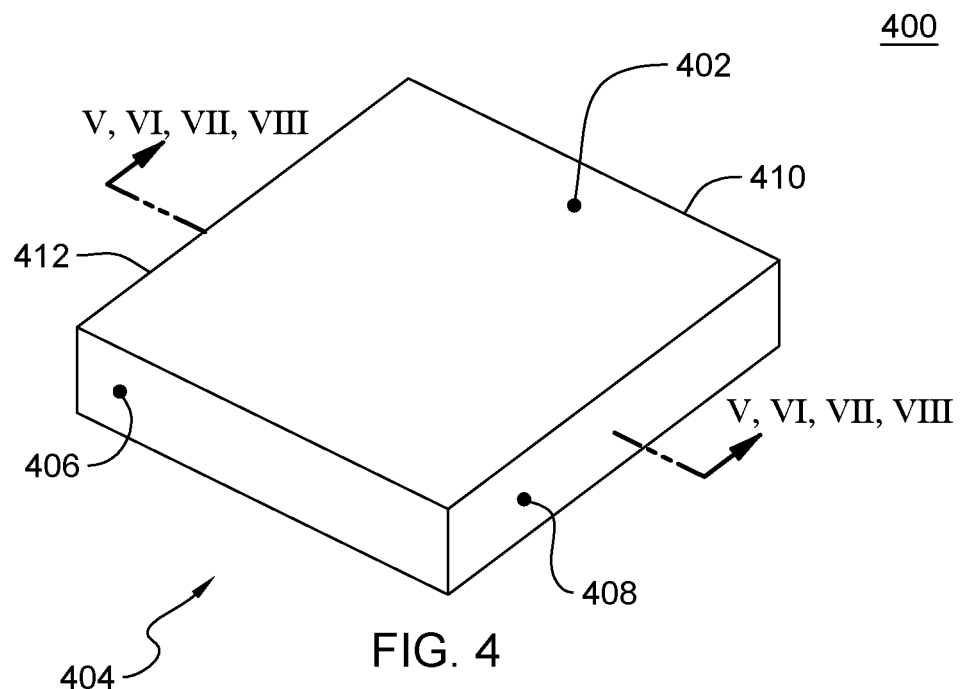
FIG. 4 is a perspective view of the outer surface of an ICP, and, more specifically.

As shown in FIG. 4, ICP package 400 includes top major surface 402; bottom major surface 404; left side surface 406; front surface 408; right side surface 410; and rear surface 412. ICP package can be varied, with respect to its internal structure to make any of the four (4) ICP embodiments to be discussed in this sub-section of the Detailed Description section, specifically: (i) ICP 500 shown in FIG. 5; (ii) ICP 600 shown in FIG. 6; (iii) ICP 700 shown in FIG. 7; and (iv) ICP 800 shown in FIGS. 8 and 9. It is noted that the outer surface of ICP 400 is generally coated, or clad, with protective material to keep external objects from coming into direct contact with the integrated circuitry of the ICP.

Figure 5:
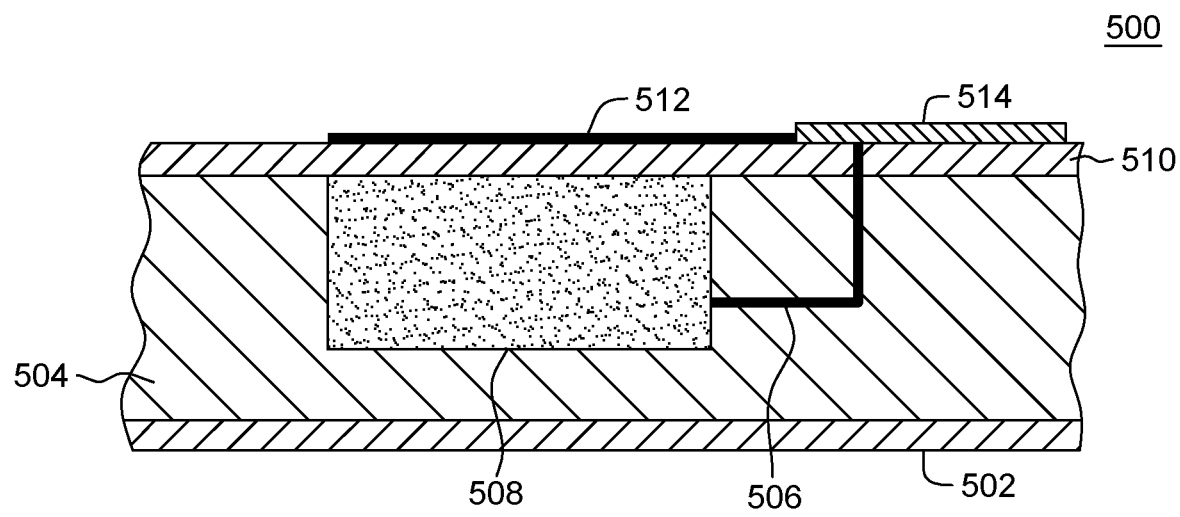
FIG. 5 is cross-sectional view of a first embodiment of an ICP according to the present invention.

As shown in FIG. 5, ICP 500 includes: bottom non-conductive protective layer 502; silicon substrate 504; conductive path 506; gold reservoir 508; top non-conductive protective layer 510; layer of metal 512; and integrated circuitry (IC) portion 514 (which forms an RC (resistor and capacitor style) capacitive oscillator).

In operation, gold reservoir 508, a portion of top non-conductive protective layer 510 and layer of metal 512, taken collectively, form a capacitor. IC portion 514 generates an electrical signal in the form of a periodic wave which has a frequency which depends, in a known way, upon the capacitance value of capacitor 508, 510, 512, which, in turn, depends upon the amount and/or geometry of gold in gold reservoir 508. Therefore, in operation, the oscillator of IC portion 514 is activated, and a capacitance measurement is taken. If this capacitance measurement measures a value that was taken at the time the ICP was first manufactured, then it can be assumed that the gold reservoir has remained intact and that the original gold reservoir has identical gold with respect to the gold it had at the time of its manufacture. If this capacitance measurement does not match the baseline measurement taken at the time of manufacture then it is likely that the ICP has been tampered with and/or accidentally damaged.

Figure 6:
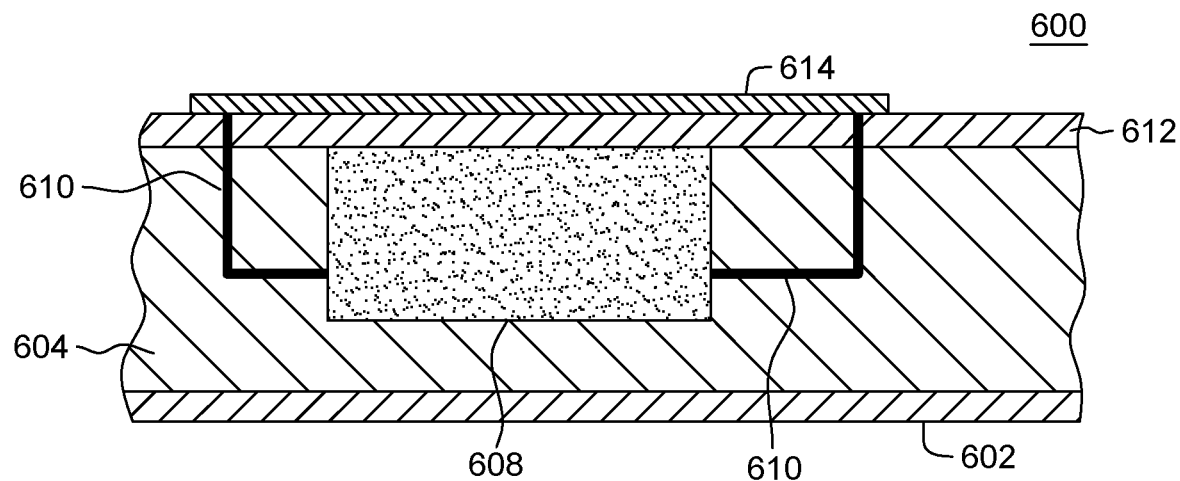
FIG. 6 is cross-sectional view of a second embodiment of an ICP according to the present invention.

As shown in FIG. 6, ICP 600 includes: bottom protective layer 602; substrate 604; gold reservoir 608; conductive paths 610; top protective layer 612; and resistance measuring circuitry 614. Conductive paths 610, on either side of gold reservoir 608, electrically connect to circuitry 614. If the gold is removed, the resistance value of the circuit will change relative to the resistance that would have been measured at the time ICP 600 was first manufactured, thus indicating tampering.

Figure 7:
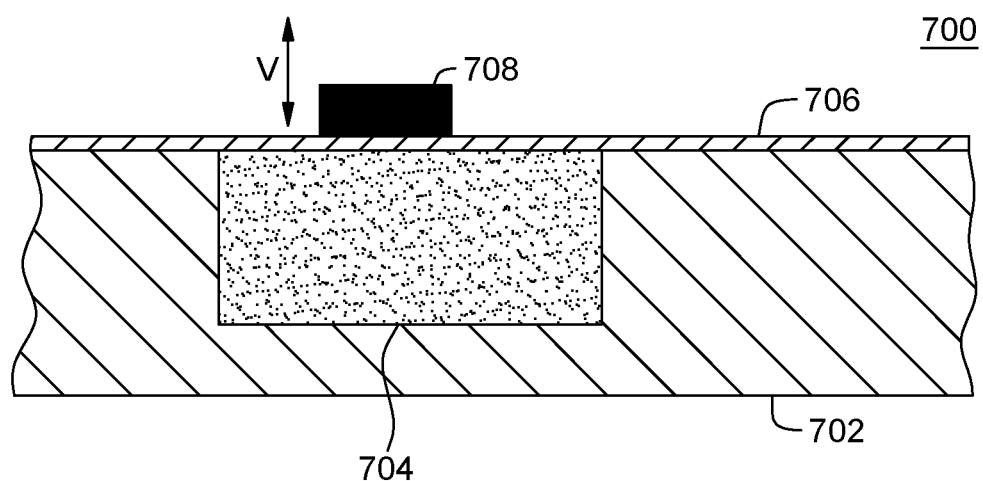
FIG. 7 is cross-sectional view of a third embodiment of an ICP according to the present invention.

As shown in FIG. 7, ICP 700 includes: substrate 702; gold reservoir 704; top protective layer 706; and piezoelectric sensor 708. Double arrow V (or direction V) indicates a vertical direction. Piezoelectric sensor 708 is oriented so that it expands and contracts in direction V. Piezoelectric sensor 708, top protective layer 706 and gold reservoir 704 form a resonant mass, which is characterized by a resonant frequency that depends upon the mass of the gold in gold reservoir 704. Changing the amount of the gold changes the mass, and causes a detectable change in the resonant frequency of the system.

Figure 8:
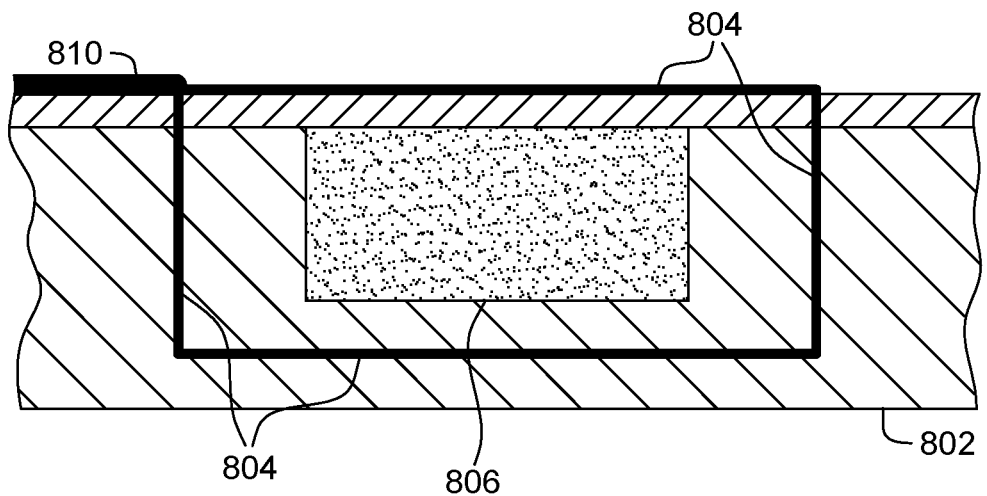
FIG. 8 is plan view of a fourth embodiment of an ICP according to the present invention.
Figure 9:
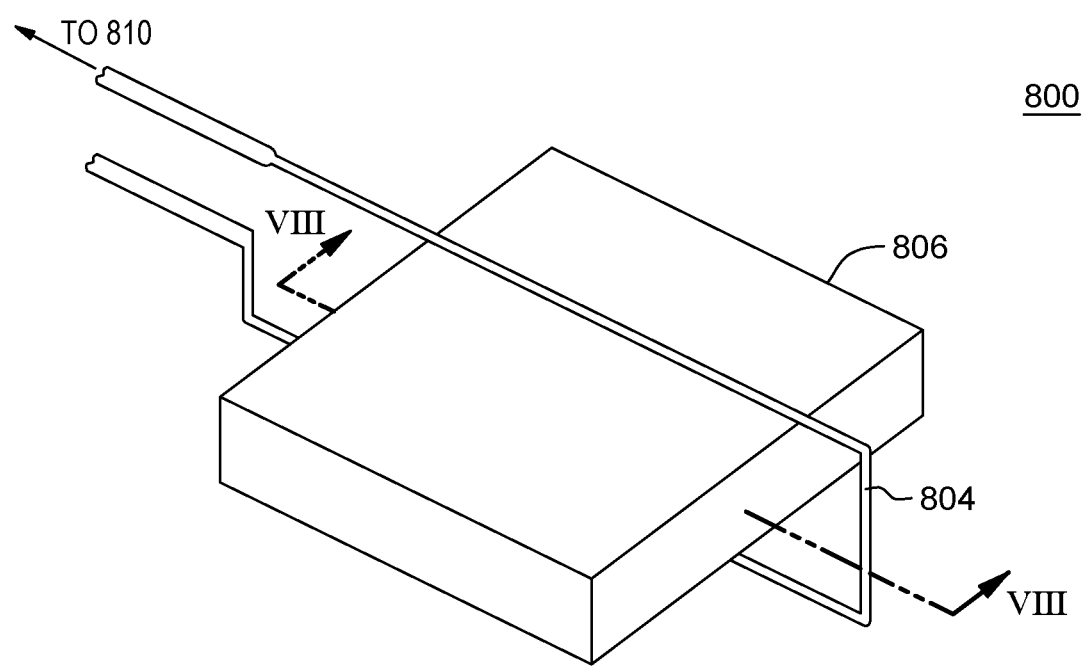
FIG. 9 is cross-sectional view of the fourth embodiment ICP according to the present invention.

As shown in FIGS. 8 and 9, ICP 800 includes: substrate 802; tamper-guard current path 804; gold reservoir 806; and IC portion 810 (which is integrated circuitry designed, structured and/or programmed to detect breaks in metal traces or vias). As shown best in FIG. 9, the tamper guard current path extends around at least a portion of the gold so that this conductive path would likely be broken if any tampering has occurred. Such breaks can be detected by activating IC portion 810. In this example, IC portion 810 may be in the form of simple connectivity detection, and/or resistance, circuitry to detect any breaks in tamper-guard conductive path 804. In this simple example, tamper-guard current path is in the form of a simple loop, which can either be "on" (intact) or "off" (that is, broken at some point(s), presumably by tampering). Alternatively, there may be many current paths (for example, current paths made of traces and vias that form a sort of net, or mesh, all around the gold. As a further alternative, a unitary foil may be wrapped around, but typically spaced apart from, the precious material, although this may complicate the function of the IC portion that determines whether an electrical characteristic of the foil deviates from some expected norm (for example, an expected electrical resistance of the foil taken as a circuit element).

III. Further Comments and/or Embodiments

Some embodiments of the present invention recognize the following facts, potential problems and/or potential areas for improvement with respect to the current state of the art: (i) placement of economic value on "precious materials" is especially true in places where, due to poverty or social instability, people do not have access to alternative wealth stores such as equity ownership or investments; (ii) in these places, people purchase small amounts of precious metals to store wealth; (iii) assuring the quality and quantity of precious metals used in transactions is costly; (iv) forging the quality and quantity of precious metal is common, requiring repeated and costly verification processes and/or establishment of an impromptu trust network; (v) these costs are most burdensome to those least able to afford them; (vi) people typically prefer fixed prices and predictability, where there is not uncertainty with respect to the economic consideration they give, or receive, in their financial transactions; (vii) certainty and granularity with respect to the value of valuable objects (for example, formally recognized forms of currency and wealth storage) can help build trust relationships and strengthen the economies (for example, micro-economies, macro-economies); (viii) another problem is the relative scarcity of precious metals traditionally used for wealth stores and currency; (ix) some precious materials have physical characteristics which make them unsuitable for use as a currency; and/or (x) overcoming the foregoing problems would increase the pool of usable precious materials, and therefore increase the pool of trusted "currency" (see definition, above, in the BACKGROUND section).

Some embodiments of the present invention may include one, or more, of the following operations, features, characteristics and/or advantages: (i) provides a currency based on verifiable quantities of precious metals; (ii) a smart card chip embedded with small amounts (typically around 1 gram) of precious metal; (iii) the smart card chip has encryption and digital signature capabilities that allow it to take part in a public key infrastructure (PKI) for the purposes of verifying the quantity and quality of precious metal stored on the chip; (iv) the precious metal is embedded in such a manner that it is very difficult to extract the gold without rendering the smart card chip inoperable (for example, physically destroying it); and/or (v) software implemented over a communication network with a Certificate Authority (CA), or the like, to vouch for the smart card chip.

Some embodiments of the present invention may include one, or more, of the following operations, features, characteristics and/or advantages: (i) embedding small quantities of precious metals in Cryptographic Smart Card chips: (ii) the precious metals are embedded in such a way that it is very difficult to remove the precious metal without destroying the cryptographic smart card; (iii) precious metal is added by one or more of a number of known ways: (a) electroplating into etched cavities in a silicon chip, and/or (b) sandwich precious metal in a cavity between two silicon chips fused together; (iv) network of fine traces/circuitry surrounding precious metal to further ensure precious metal cannot be extracted without destroying/compromising Smart Card; (v) chips can have sensors to detect attempts to remove precious metal (for example, resistive sensors, capacitive sensors, micro-electromechanical system (MEMS, for example, precious metal is on vibrating beamz—change in fundamental frequency indicates change in amount of precious metal), temperature sensors, chemical sensors); (vi) chip provides authentication/encryption services—similar to how smart card chips work presently; (vii) the authentication/encryption services verify that the card has been certified by a CA (certifying authority entity) to include a certain quantity, type and quality of precious material; (viii) offer these Smart cards to buyers at a slight premium over spot price; (ix) provide verification services; (x) the packaging of the smart card chip provides a type of verification; and/or (xi) another type of verification is provided by the CA.

Some embodiments of the present invention may include one, or more, of the following operations, features, characteristics and/or advantages: (i) a device comprising a substrate; (ii) a known quantity of a precious metal embedded in the substrate; (iii) a digital signature circuit which would be destroyed by a removal of the embedded precious metal; (iv) the device is a smart card chip which has been certified by a certificate authority to contain the known quantity of the precious metal; (v) comprises a network of circuitry surrounding the embedded precious metal; (vi) comprises a sensing circuit which sense an attempt to remove the embedded precious metal; and/or (vii) comprises a verification service for certifying a device.

Some embodiments of the present invention may include one, or more, of the following operations, features, characteristics and/or advantages: (i) the precious material (for example, gold) can be extracted by any existing refining technique suitable for the precious material used; (ii) because gold is embedded in a silicon substrate, it is similar to refining gold from ore; (iii) examples of gold refining techniques include aqua regia method or mercury solution method—these are methods available even in communities with very primitive technologies, which has several advantages including the following: (a) as a verification process, if a holder does not trust the other verification methods (smartcard verification, physical anti-forgery methods), they can as a last-ditch means extract the gold and weigh it, and/or (b) the gold is easily available for other purposes (for example, if one possesses a number of these cards, and that individual decides he wants to make jewelry, that individual can easily extract the gold; (iv) other metals can be used as the precious material, including exotic metals; and/or (v) to extract gold from the ICP, one only needs to smash the smartcard up, destroying it, and either use aqua regia, mercury, or some other refining method to separate the gold from the silicon.

There is a potential advantage of putting the gold bodily into the ICP, as opposed to having the issuer store all the gold corresponding to all the smart cards in a secure location (not in the ICP) so that a bearer of a smartcard can recover the gold directly from the issuer instead using an ICP, which potential advantage will now be discussed. Physical possession of the gold is this potential advantage. Many people prefer to physically hold the gold, either for trust reasons or to be able to use it. This is especially important when this is used in remote locations, where it would be hard for an owner to request the gold.

Pretty much any metal or substance that can be plated into a chip could be used as the "precious material." Theoretically, even non-metallic, liquid, or gaseous substances could be used, although different insertion methods would be required. This might be a way of ensuring the integrity of small amounts of extremely precious or sensitive substances. Additionally, some metals are precious, but are not suitable for distribution as coins/ingots due to their physical properties, and therefore are not popular as wealth stores. But these could be deposited into a smart chip, negating problems that these precious metals may have in the coin or ingot context. An example is osmium which is volatile and toxic and therefore less than ideal for handling, but in a smartcard it would be protected from oxidation.

In some embodiments, the smartcard, of which the ICP is an integral part, is important to the storage device, because the smartcard verifies the unique identity of the goldcard. This, along with an easily accessed Certifying Authority (CA) gives a high degree of confidence that: (i) the smartcard is what it purports to be; and (ii) the smart card is accurately stating the amount of gold it contains. Because the precious materials are placed inside the ICP, which is inside of the smartcard, and further because integrated circuits are delicate, it is typically quite difficult to extract the gold without destroying the smart card. Also, smartcards are very difficult to counterfeit. That is, it is not difficult to obtain a smartcard, but it is extremely difficult to make one smartcard impersonate another. Even if an individual owns a semiconductor manufacturing facility with the capability of making state-of-the-art smartcards, that individual cannot duplicate the private key which is unique to each smartchip. Also, in some embodiments, the smartcard is not the whole story—the other part is the Certifying Authority (CA), a trusted entity that registers the smartcard and vouches for it.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. An integrated circuit package product (ICPP) comprising an integrated circuit package (ICP) that includes:
   integrated circuitry;
   a set of substrate layer(s);
   a precious material reservoir made of one, or more, precious material(s); and
   a tamper detection device;
   wherein:
   the integrated circuitry is located on and/or between substrate layers of the set of substrate layers;
   the precious material reservoir is at least partially embedded in the set of substrate layer(s); and
   the tamper detection device is structured, located, connected and/or programmed to provide an indication of tampering on condition that the physical integrity of the ICPP has been compromised.

2. The ICPP of claim 1 further comprising:
   a smart card, with the ICP being embedded in the smart card; and
   wherein the ICP is in the form of a smart card chip.

3. The ICPP of claim 1 wherein the precious material reservoir is non-unitary and includes at least two discrete portions.

4. The ICPP of claim 1 wherein the precious material reservoir includes a precious metal.

5. The ICPP of claim 4 wherein the precious metal is gold.

6. The ICPP of claim 1 wherein the tamper detection device is further structured to provide an indication of tampering by providing an indication of an amount of precious material(s) in the precious material reservoir.

7. The ICPP of claim 6 wherein the tamper detection device is further structured, located, connected and/or programmed to determine at least one of the following electrical characteristics of the precious material reservoir: capacitance, resistivity, resistance, conductivity and/or inductance.

8. The ICPP of claim 1 wherein the tamper detection device is further structured to provide an indication of tampering by providing an indication of a geometry and/or shape of precious material(s) in the precious material reservoir.

9. The ICPP of claim 8 wherein the tamper detection device is further structured, located, connected and/or programmed to determine at least one of the following electrical characteristics of the precious material reservoir: capacitance, resistivity, resistance, conductivity and/or inductance.

10. The ICPP of claim 1 wherein the tamper detection device includes a set of conductive path(s) which respectively extend around at least a portion of the precious material reservoir so that a break in a path of the set of conductive path(s) indicates tampering.

11. The ICPP of claim 10 wherein the set of conductive path(s) include: a plurality of electrically conductive traces and a plurality of electrically conductive vias.

12. The ICPP of claim 1 wherein the integrated circuitry includes a data storage element that has stored reservoir data indicating a mass of the precious material reservoir as determined at a time of manufacture of the ICPP.

13. The ICPP of claim 1 wherein the integrated circuitry includes a data storage element that has stored a set of electrical characteristic value(s) characterizing the precious material reservoir at the time of manufacture of the ICPP.

14. The ICPP of claim 13 wherein the set of electrical characteristic value(s) include at least one of the following types of electrical characteristic values: capacitance, resistivity, resistance, conductivity, inductance and/or piezoelectric related.

15. An integrated circuit package product (ICPP) comprising an integrated circuit package (ICP) that includes:
    integrated circuitry;
    a set of substrate layer(s); and
    a precious material reservoir made of one, or more, precious material(s);
    wherein:
    the integrated circuitry is located on and/or between substrate layers of the set of substrate layers;
    the precious material reservoir is at least partially embedded in the set of substrate layer(s); and
    the integrated circuitry includes a data storage element that has stored reservoir data indicating a mass of the precious material reservoir as determined at a time of manufacture of the ICPP.

16. The ICPP of claim 15 further comprising:
    a smart card, with the ICP being embedded in the smart card; and
    wherein the ICP is in the form of a smart card chip.

17. The ICPP of claim 15 wherein the precious material reservoir includes a precious metal.

* * * * *